United States Patent
Schäfer

(10) Patent No.: US 7,758,012 B2
(45) Date of Patent: Jul. 20, 2010

(54) DIE COMPRISING SMALL CUP-TYPE DEPRESSIONS

(75) Inventor: Philipp Schäfer, Hannover (DE)

(73) Assignee: BASF SE, Ludwigshafen (DE)

( * ) Notice: Subject to any disclaimer, the term of this patent is extended or adjusted under 35 U.S.C. 154(b) by 526 days.

(21) Appl. No.: 11/816,782

(22) PCT Filed: Mar. 3, 2006

(86) PCT No.: PCT/EP2006/060441
§ 371 (c)(1),
(2), (4) Date: Aug. 21, 2007

(87) PCT Pub. No.: WO2006/092440
PCT Pub. Date: Sep. 8, 2006

(65) Prior Publication Data
US 2008/0251191 A1    Oct. 16, 2008

(30) Foreign Application Priority Data
Mar. 4, 2005 (AT) ............... GM131/2005
Mar. 4, 2005 (DE) ............... 20 2005 003 532 U

(51) Int. Cl.
*D06N 3/00* (2006.01)
*B29C 41/12* (2006.01)

(52) U.S. Cl. .............. 249/55; 156/242; 264/48

(58) Field of Classification Search .......... 249/55; 264/48, 137; 156/242, 272.8
See application file for complete search history.

(56) References Cited

U.S. PATENT DOCUMENTS

| | | | |
|---|---|---|---|
| 3,776,790 A * | 12/1973 | Harrington | 156/79 |
| 4,216,251 A * | 8/1980 | Nishimura et al. | 427/370 |
| 4,363,686 A | 12/1982 | Komarek | |
| 4,497,871 A * | 2/1985 | Henke | 428/473 |
| 5,728,328 A * | 3/1998 | Senda et al. | 264/39 |
| 7,169,457 B2* | 1/2007 | Suto et al. | 428/141 |
| 7,655,726 B2* | 2/2010 | Clauss et al. | 525/66 |
| 2005/0064178 A1* | 3/2005 | Gray et al. | 428/327 |

FOREIGN PATENT DOCUMENTS

| | | |
|---|---|---|
| DE | 30 04 327 A1 | 8/1981 |
| DE | 195 10 240 A1 | 5/1995 |
| EP | 1 063 071 A2 | 12/2000 |
| WO | WO2005047549 * | 5/2005 |

OTHER PUBLICATIONS

International Preliminary Report on Patentability for PCT/EP2006/060441, dated Sep. 20, 2007, 11 pages.

* cited by examiner

Primary Examiner—Yogendra N Gupta
Assistant Examiner—Emmanuel S Luk
(74) Attorney, Agent, or Firm—Connolly Bove Lodge & Hutz LLP

(57) ABSTRACT

In order to produce a coating having an attractive, velvet-like or suede-like appearance for a substrate by application of a liquid plastic dispersion to the die surface 3 consisting of hydrophobic plastic and subsequent solidification of this plastic material, a die is used whose surface 3, according to the invention, has a gloss of less than 2.2 according to DIN 67530 at an angle of incidence of 60° and is provided with microscopically small well-like indentations 4.

20 Claims, 1 Drawing Sheet

DIE COMPRISING SMALL CUP-TYPE DEPRESSIONS

CROSS REFERENCE TO RELATED APPLICATIONS

This application is a National Phase filing under 35 U.S.C. §371 of PCT/EP2006/060441filed Mar. 3, 2006, which claims priority to Patent Application No. 202005003532.7, filed in Germany on Mar. 4, 2005, and Patent Application No. GM131/2005 filed in Austria on Mar. 4, 2005. The entire contents of each of the above-applications are incorporated herein by reference.

BACKGROUND OF THE INVENTION

The present invention relates to a die for the production of a coating which can be bonded to a sheet-like substrate, in particular a leather or a textile material, such as a nonwoven, woven fabric or knitted fabric, and is formed by application of a plastic dispersion to the die surface consisting of hydrophobic flexible plastic and subsequent solidification of the liquid plastic dispersion.

It is known that the top of a leather, in particular a grain leather buffed on its grain side, but also a split leather, and a textile material can be provided with a coating having a grain structure so that the visible side thereof has the required properties and possesses a leather-like appearance. For this purpose, a coating or finish is first produced separately on an underlay which has a surface structure to correspond to the grain structure of the finish to be produced, and is then bonded to the substrate. In the production of this finish, a plastic dispersion is applied to the die surface consisting of hydrophobic material and then allowed to solidify by supplying heat. If the finish is to have a suede-like or velvet-like appearance, it has already been proposed to use, for the production of this finish, a die whose surface has a structure which corresponds to the suede-like or velvet-like structure of the finish to be produced. The surface of the die can be formed, for example, by casting the visible side of an existing nubuk leather. Finishes produced in this manner have the disadvantage that the fibers forming the suede effect bend over even at very low pressure and remain in this position until they are brought mechanically into an upright position again or are brought into another position.

BRIEF DESCRIPTION OF THE INVENTION

It is the object of the present invention to provide a die for the production of a finish or coating which has a very attractive suede-like or velvet-like appearance, the suede-like surface in particular also not changing its appearance after loading. The term coating is used in association with textile and finish in association with leather.

For achieving this object, the invention proposes that the surface of the die have a gloss of less than 2.2 according to DIN 67530 at an angle of incidence of 60° and be provided with microscopically small well-like indentations, i.e. indentations which are not visible to the naked eye. After solidification of the liquid plastic dispersion which has penetrated into these well-like indentations, fine, individually projecting small hairs which do not mutually influence one another form in these indentations which are not visible to the unaided eye but become visible only on strong magnification, for example 1:25 or 1:50, between which hairs spaces are left so that, as a result of the arrangement of the well-like indentations in combination with the matt surface of the die, a short-fiber, velvet-like visible side of the coating is created in which no troublesome shiny areas are also present between the hairs, and it is ensured that, after pressure relief, the small hairs return to the upright position and an attractive suede-like appearance of the coating is thus maintained without additional measures. A further advantage of a coating formed by means of the die according to the invention is that dirt which has penetrated between the small hairs can be removed again in a simple manner since it cannot stick in a fiber entanglement, as is the case in known versions. In the context of the present invention, plastic dispersions or liquid plastic dispersions are aqueous plastic dispersions.

The gloss is determined by means of a commercially available reflectometer according to DIN 67530. A light beam emitted by a light source is directed at a certain angle of incidence onto the surface of the object whose gloss is to be determined, and the intensity of the light reflected by this surface is measured. This intensity depends both on the chosen angle of incidence and on the material of which the surface consists, in particular on the hue of this surface. In the case of a dark surface, a part of the light beam striking the surface penetrates into the material and is partly absorbed there, depending on the hue; in the case of a light surface, the reflection is greater. Moreover more light is reflected with increasing angle of incidence.

In the gloss determination according to the invention, an angle of incidence of 60° was chosen so that the light beam also penetrates into the well-like indentation and these too are therefore taken into account in the gloss determination.

As mentioned, different hues of the die surface lead to different gloss values. According to the invention, a die having a light surface, for example having a surface comprising light gray silicone rubber or comprising light polypropylene, should have a gloss of less than 2.2, preferably less than 1.8, and a die having a dark surface, for example a surface comprising dark red silicone rubber or comprising dark gray polypropylene, should have a gloss of less than 1.2, preferably less than 0.7.

The color measurement of the die surface is determined according to ISO 7724 in the CIELAB system using a spectrophotometer with a measuring geometry of 45/0 and 10° observer under standard illuminant D 65. Dies having a light surface have a value of more than 50 on the ΔL axis and dies having a dark surface have a value of less than 50 on the ΔL axis.

Expediently, the die consists of at least two layers, the surface of the uppermost layer having the well-like indentations being formed from a hydrophobic flexible plastic. Hydrophobic flexible plastics are chosen so that firstly they can be used in the aqueous dispersion and can form films. Secondly hydrophobic flexible plastics must be chosen so that the films formed can be detached from the die according to the invention without destruction, preferably without the use of a release agent. Preferred examples of hydrophobic flexible plastics are therefore preferably consists of polypropylene, silicone resin, silicone rubber or a fluoropolymer, which is to be understood as meaning a polymer of fluorine-containing monomers, in particular polytetrafluoroethylene. The last-mentioned materials are particularly suitable for the production of the coating from a plastic dispersion and have the advantage that the solidified coating can be easily detached from the die surface provided with the well-like indentations. A substrate layer which consists of a textile material, such as a woven fabric, knitted fabric or nonwoven, or of paper is preferably arranged below this uppermost layer. However, a layer which consists of metal and which additionally serves as a heat store in the production of the coating and promotes the solidification of the liquid plastic dispersion for the formation of the coating or finish can also be arranged below the uppermost layer. This layer consisting of metal can be provided instead of the substrate layer consisting of textile material or of paper or in addition to this substrate layer.

However, the well-like indentations can also be arranged in a substrate layer which is covered by a layer forming the top, lining the well-like indentations and consisting of hydrophobic plastic material.

The total thickness of the die is from 0.6 mm to 4.8 mm but in particular may also be greater in the case of an arrangement of a layer consisting of metal.

The well-like indentations in the surface of the die can be formed in a simple manner by a preferably computer-controlled laser treatment of this surface. However, these well-like indentations can be formed in the production of the die also by casting from a corresponding negative mold. A procedure is adopted here in which an intermediate mold is formed by casting the substrate surface having small hairs and a negative mold is produced by casting the surface of this intermediate mold, from which negative mold the die surface provided with the well-like indentations is formed.

The well-like indentations may have any desired cross section, i.e. for example may also be polygonal. Preferably, these well-like indentations have a round, for example spherical or oval, cross section, by means of which the removal of the coating formed on the die is also facilitated. The same purpose is served if the well-like indentations have a cross section tapering toward the bottom thereof. Moreover, small hairs tapering toward the tip form in the last-mentioned shaping of the well-like indentations on the visible side of the coating, which facilitates the removal of the impurities present between the small hairs.

It is optimal if the center-to-center distance (a) of adjacent well-like indentations is from 50 μm to 150 μm, preferably from 60 μm to 90 μm, and the depth (t) of the well-like indentations is from 50 μm to 150 μm, preferably from 60 μm to 90 μm.

The bottom of the well-like indentations is expediently rounded, preferably concave or convex, with the result that the haptic properties and the suede-like appearance of the small hairs of the coating which are formed in these well-like indentations are improved.

As is known, the die may be sheet-like or web-like, it being possible for the die to have the form of a continuous web in the latter case.

BRIEF DESCRIPTION OF THE DRAWINGS

In the drawing, the invention is explained schematically with reference to a working example.

DETAILED DESCRIPTION OF THE INVENTION

Figure 1:
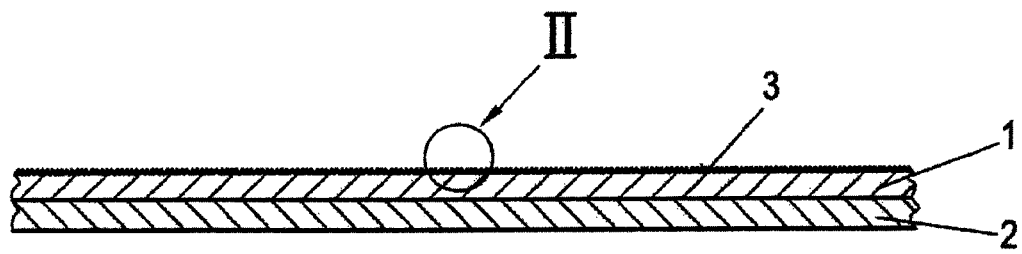
FIG. 1 shows a cross section through a die according to the invention, approximately in natural size.

The die shown in cross section in FIG. 1 has a layer 1 consisting of a hydrophobic plastic material and a substrate layer 2. The layer 1 preferably consists of polypropylene, silicone resin, silicone rubber or a fluoropolymer, in particular polytetrafluoroethylene, and is provided on its matt surface 3 with microscopically small well-like indentations 4 which are shown on a greatly magnified scale in FIG. 2. If the surface 3 consists of a light material, for example a light gray silicone rubber, it has a gloss of less than 2.2 according to DIN 67530 at an angle of incidence of 60°; if it consists of a dark material, such as, for example, dark red silicone rubber, it has a gloss of less than 1.2 according to DIN 67530 at an angle of incidence of 60°.

The substrate layer 2 consists of a textile material, in particular a woven fabric, knitted fabric, nonwoven, or of paper. However, a layer which consists of metal and is not shown can also be provided instead of the substrate layer 2 or in addition to it on the underside thereof. Furthermore, the substrate layer 2 may have the well-like indentations 4, in which case the layer 1 is formed by thinly covering the substrate layer 2 with a hydrophobic plastic material, with which the well-like indentations 4 are also lined. In any case, both the surface 3 of the die and the walls of the well-like indentations 4 are matt.

Figure 2:
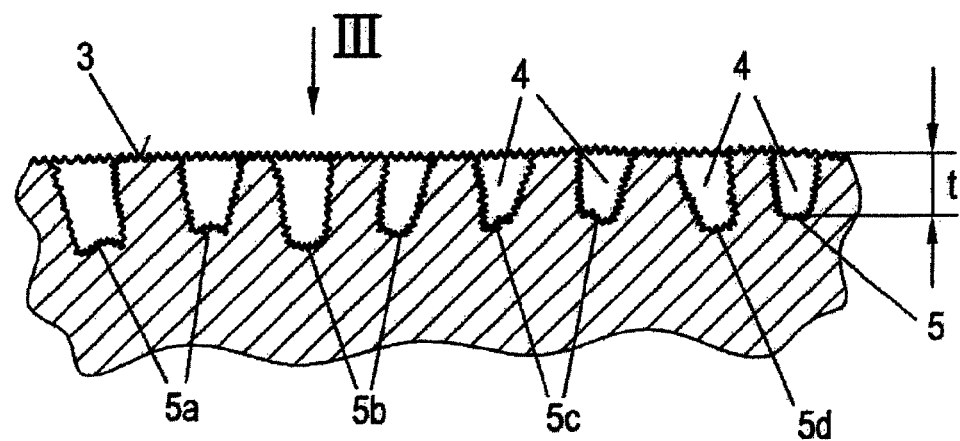
FIG. 2 shows, on a very magnified scale, section II from FIG. 1 with the well-like indentations.

As is evident from FIG. 2, in which the well-like indentations 4 are shown on a very greatly magnified scale in cross section, the well-like indentations 4 have a cross section tapering toward the bottom 5. The depth (t) of the well-like indentations 4 is different and is preferably from 60 μm to 90 μm. FIG. 2 furthermore shows various possibilities of the formation of the bottom 5 of the well-like indentations 4. This bottom is convex at 5a, concave at 5b, provided with steps at 5c and flat at 5d.

The walls of the well-like indentations 4 can also be provided with longitudinal grooves or with twisted grooves.

Figure 3:
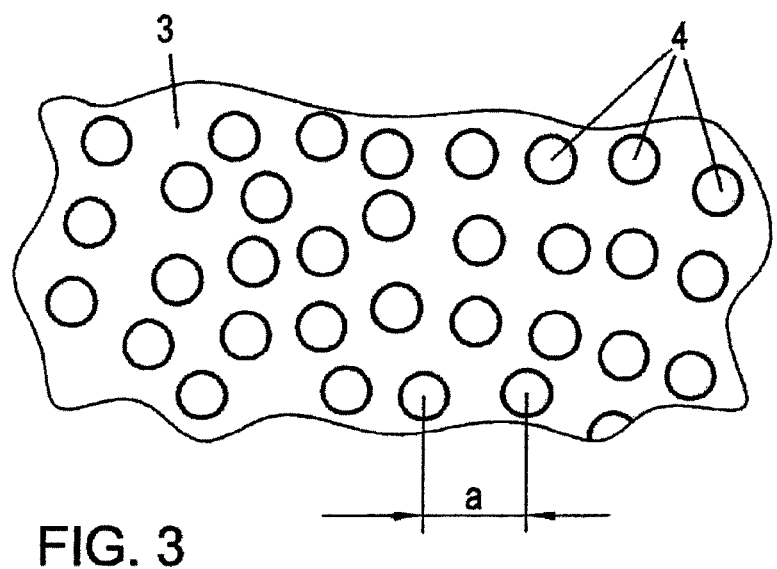
FIG. 3 shows a plan view in the direction of the arrow III in FIG. 2.

As is evident from FIG. 3, the well-like indentations 4 have a circular cross section with a circle diameter up to 25 μm in the working example shown. However, it may also have any other desired cross section, in particular an oval or a polygonal cross section. The center-to-center distance a of adjacent well-like indentations is as a rule different and is preferably from 50 μm to 150 μm. In the working example shown, the well-like indentations 4 are arranged irregularly on the surface 3 and may also be provided in the form of a regular pattern.

The die itself may be in the form of a sheet or preferably in the form of a continuous web.

In the production of a coating or finish which is subsequently bonded to a sheet-like substrate, such as a leather or textile material, on the die according to the invention, the procedure is adopted in which first a liquid plastic material is applied to the surface 3 provided with the well-like indentations 4 and is allowed to solidify, whereupon the coating thus formed is removed from the die. As a result of the arrangement of the well-like indentations 4, fine, individually projecting small hairs which are arranged a distance apart and impart a nubuk-like or velvet-like appearance to the coating form on the coating or finish.

The present invention therefore furthermore relates to a process for the production of a coating of textile material using a die according to the invention.

The invention therefore furthermore relates to a process for the production of a film-like finish of leather using a die according to the invention.

The present invention therefore furthermore relates to coated textile materials and finished leathers, produced by the above-characterized process according to the invention. Coated textile materials and finished leathers according to the invention have an attractive suede-like or nubuk-like or velvet-like appearance.

We claim

1. A die for the production of a coating, which can be bonded to a substrate in the form of a sheet, and is formed by application of a liquid plastic dispersion to a surface of the die, consisting of a hydrophobic, flexible plastic and subsequent solidification of the liquid plastic dispersion, wherein a surface has a gloss of less than 2.2 according to DIN 67530 at an angle of incidence of 60° and is provided with microscopically small indentations in the form of wells which are formed by laser treatment of surface, and wherein a center to center distance of adjacent indentations in the form of wells is from 50 µm to 150 µm and a depth of the indentations in the form of wells is from 50 µm to 150 µm.

2. The die according to claim 1, wherein the substrate is selected from leather and textile materials.

3. The die according to claim 2, wherein textile material is selected from nonwovens, woven fabrics and knitted fabrics.

4. The die according to claim 1, wherein a light surface has a gloss of less than 2.2 and a dark surface has a gloss of less than 1.2.

5. The die according to claim 1, which consists of at least two layers (1, 2), wherein an uppermost layer has the indentations which are formed from the flexible plastic.

6. The die according to claim 1, wherein a substrate layer which consists of textile material or of paper is arranged below the uppermost layer.

7. The die according to claim 1, wherein a layer consisting of metal is arranged below the uppermost layer.

8. The die according to claim 1, wherein the indentations are arranged in a substrate layer which is covered by a layer forming the surface, lining the indentations and consisting of hydrophobic plastic material.

9. The die according to claim 1, wherein the surface consists of polypropylene, silicone resin, silicone rubber or a fluoropolymer.

10. The die according to claim 1, wherein the laser treatment of the surface is computer-controlled.

11. The die according to claim 1, wherein the indentations are formed during the production of the die by casting from a negative mold.

12. The die according to claim 1, wherein the indentations have a round cross section.

13. The die according to claim 1, wherein the indentations have a cross section tapering toward the bottom thereof.

14. The die according to claim 1, wherein the center-to-center distance of adjacent indentations is from 60 µm to 90 µm.

15. The die according to claim 1, wherein the depth of the indentations is from 60 µm to 90 µm.

16. The die according to claim 1, wherein a bottom of the indentations is rounded.

17. The die according to claim 1, which is a sheet or a web.

18. A method for the production of a coating of textile material using a die according to claim 1.

19. A method for the production of a leather film finish using a die according to claim 1.

20. The die according to claim 1, wherein a bottom of the indentations is concave or convex.

\* \* \* \* \*